April 18, 1933.    R. BERNAT ET AL    1,904,817
REFRIGERATING PLANT
Filed July 9, 1931
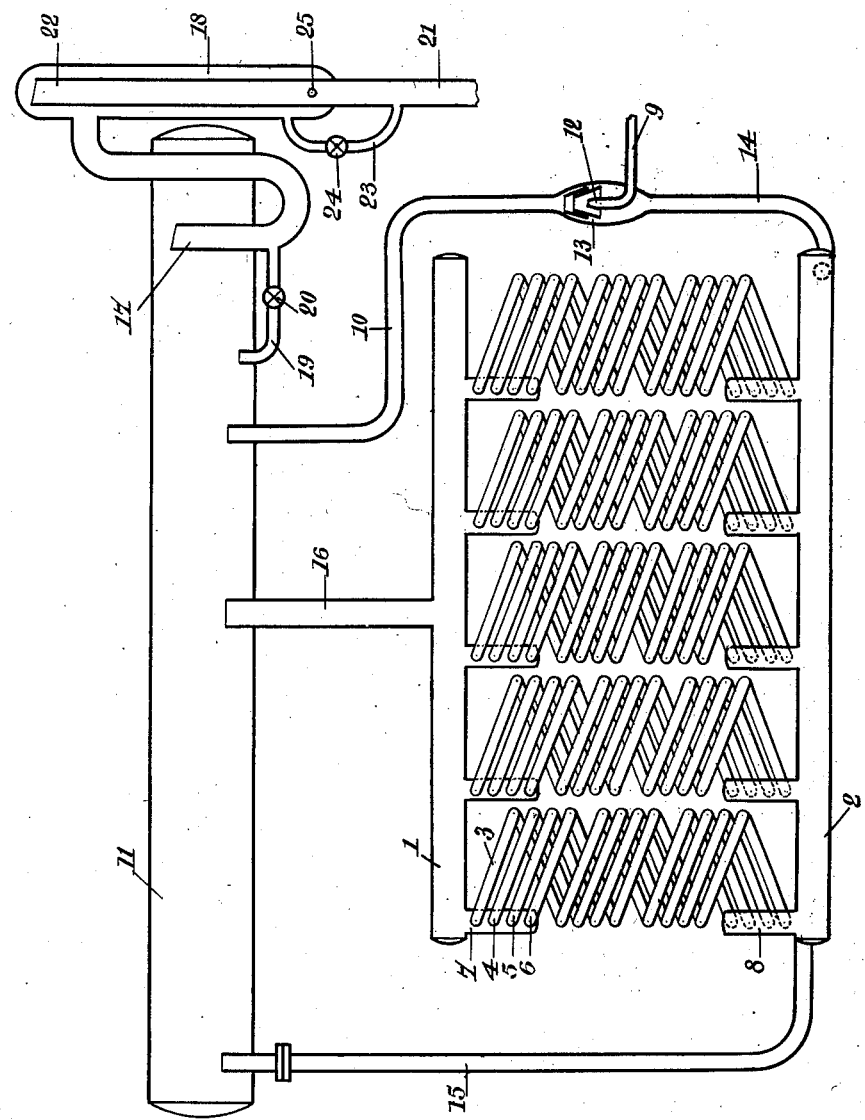
Inventors:
R. Bernat
& H. Bernat,
By E. F. Ohendorf
Atty Patented Apr. 18, 1933

1,904,817

UNITED STATES PATENT OFFICE

RAOUL BERNAT AND HENRI BERNAT, OF BORDEAUX, FRANCE

REFRIGERATING PLANT

Application filed July 9, 1931, Serial No. 549,746, and in France July 16, 1930.

The present invention relates to refrigerating apparatus which are employed in installations for the production of cold. It consists in the use of worm-tubes having the form of a helix with large pitch, the pitch being of the same order of magnitude as the diameter of the helix. This will afford a rapid circulation of the liquefied gas, which is furthered by the rapid rise of the gas bubbles in the large-pitch helix. It is preferable to mount a certain number of worm-tubes in parallel, these being superposed and having the form of coaxial helices of like pitch.

The invention further comprises a device by which the oil is raised from the lower main conduit to the collecting recipient used for the cooling product. In one arrangement having a suitable disposition, the oil is drawn forward by the liquefied gas delivered by the compressor and issuing from a nozzle.

In conformity to the invention, the plant comprises piping which connects the lower part of the collecting recipient used for the cooling product, with the pipe discharging the gas formed by the evaporation; the oil accumulating at the bottom of said recipient may thus be evacuated and returned to the circuit. On the other hand, said piping gives passage to a greater or less amount of liquefied gas, and thus the plant can be operated by superheating, half-superheating or by the wet process. A controlling cock may be mounted on the said piping. In one construction, the piping leads into the lower part of the gas discharge pipe, which has a U-shape.

The invention further covers the arrangement of a compensating vessel in the circuit of the gas proceeding from the cooling apparatus to the compressor, and said vessel has an offtake at the top of the discharge of the gas, and an offtake at the bottom for the discharge of the oil or the liquefied gas; this latter offtake has a restricted orifice or a cock, for regulating the output of oil and liquefied gas.

The following description and accompanying drawing, which are given by way of example, relate to an embodiment of the invention.

In the present construction, the refrigerating apparatus properly so called comprises two main conduits 1, 2 between which are mounted a certain number of worm-tubes. Each tube consists of a pipe 3 which has the form of a helix whose pitch is substantially equal to the diameter of the helix. Due to this pronounced pitch, the gas bubbles given off will readily rise and will hence cause a very rapid circulation of the liquid, thus furthering the exchange of heat between the fluids in presence. Four coaxial worm-tubes 3, 4, 5, 6, are thus employed, and their ends are connected, in parallel, with necks such as 7, 8. In the arrangement shown in the figure, there are employed five sets of worm-tubes which are mounted in groups of four between the main conduits 1 and 2.

The liquefied gas from the compressor enters through the pipe 9 and passes through the tube 10 into the recipient 11. At 12 is mounted a nozzle situated in a chamber 13 which is connected by a pipe 14 with the lower part of the conduit 2; the oil collecting in the conduit 2 is drawn forward with the liquid issuing from the nozzle 12, and this oil collects in the recipient 11 together with the liquid supplied by the compressor. This liquid circulates through the pipe 15 into the lower conduit 2 of the refrigerating apparatus; it evaporates in the said worm-tubes, and the gases which are given off will return to the recipient 11 through the conduit 1 and the neck 16. The said recipient 11 thus contains gas, condensed liquid and oil, which become separated. The gas escapes through the pipe 17 and returns to the suction end of the compressor after passing through the compensating device 18.

The pipe 17 has a U-shape, and the lower part of the U is connected by a pipe 19 with the lower part of the recipient 11; since the pipe 17 opens into the upper part of said recipient, the gas alone will pass through this upper end, whilst the oil and the condensed liquid will issue through the pipe 19, and thus the gas draws the oil with it towards the compressor and again places it automatically in the circuit without requiring any auxiliary apparatus. By acting upon a cock so the operator can admit a greater or less amount of the condensed liquid which is drawn forward with the oil, and in this manner the apparatus will work, as desired, by superheating, half-superheating or by the wet process.

The gas, the condensed liquid and the oil are brought together in a compensating vessel 18; the gas escapes through the pipe 21 whose end 22 communicates with the upper part of the vessel 18, and the gas proceeds thence through the said pipe 21 into the suction end of the compressor. On the other hand, the oil and the liquid (if any) will circulate into the pipe 21 through a pipe 23, and the output of this latter can be controlled by a cock 24, by which the proper supply of oil can be regulated. A practically equivalent result can be obtained by providing an orifice 25 in the wall of the tube 21 at the lower part of the compensating vessel 178, and thus the oil may be gradually returned to the circuit.

The upper end of the pipe 15 situated in the conduit 11 is above the level of the tube 10, and on the other hand, the volume of the conduit 11 is such that it will contain practically the whole amount of gas in the installation.

Having now particularly described and ascertained the nature of our invention and in what manner the same is to be performed, we declare that what we claim is:

1. A refrigerating apparatus comprising an upper receptacle, a lower receptacle, refrigerating tubes extending between said receptacles and connecting the same, means for leading a refrigerating liquid from the lower receptacle to the upper receptacle, an exit conduit leading from the upper portion of the upper receptacle and another conduit leading from the lower part of said receptacle to said exit conduit.

2. An apparatus as set forth in claim 1 in which the exit conduit is U-shaped and the lower part of said U-shaped conduit being disposed at a level lower than the base of said upper receptacle and the upper part of said U-shaped conduit being disposed at a level higher than the level of the upper receptacle.

3. A refrigerating apparatus comprising an upper receptacle, a lower receptacle, refrigerating tubes connecting said receptacles, means for leading the refrigerating liquid from the lower receptacle to the upper receptacle, a U-shaped exit conduit connecting the upper portion of said upper receptacle and another conduit, one end of which is connected to the lower part of the upper receptacle and the other end being connected to the lower portion of the U-shaped exit conduit.

4. A refrigerating apparatus as set forth in claim 1 comprising a compensating vessel to which the exit conduit is connected, a tube having an orifice thereof disposed in the upper portion of said compensating vessel and a second descending tube connecting the lower portion of said compensating vessel with said first-mentioned tube.

In testimony whereof we have signed this specification.

RAOUL BERNAT.
HENRI BERNAT.